July 14, 1931.  G. LANGFORD  1,814,835
RAIL JOINT BAR
Filed April 25, 1930  3 Sheets-Sheet 1
Fig. 1.
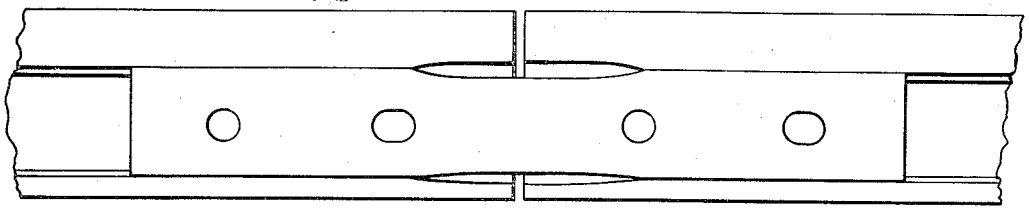
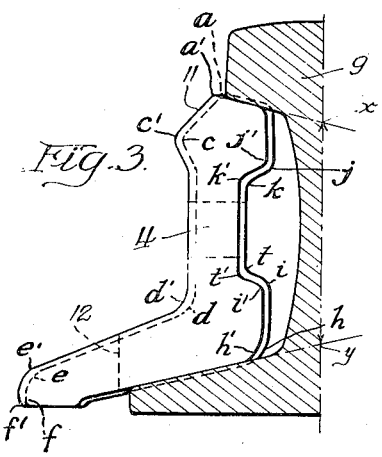
Fig. 3.
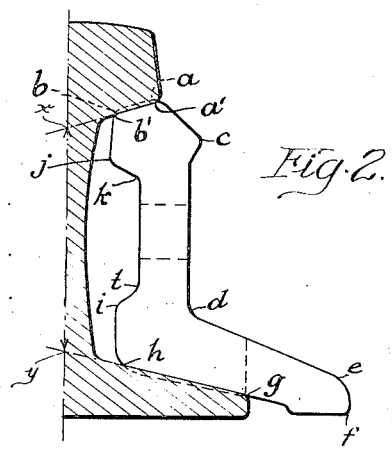
Fig. 2.
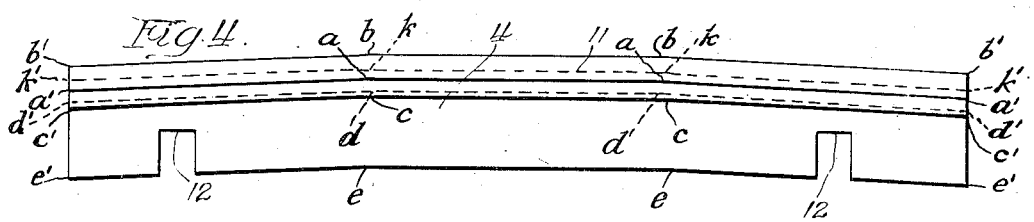
Fig. 4.
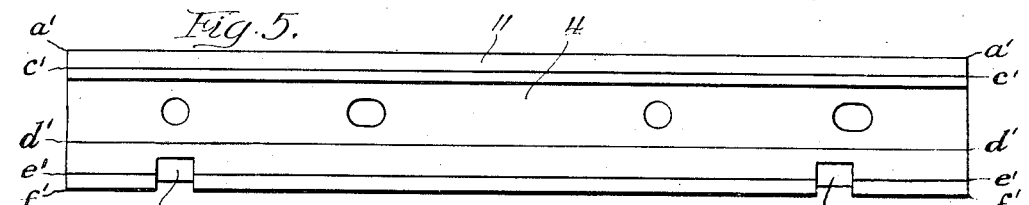
Fig. 5.
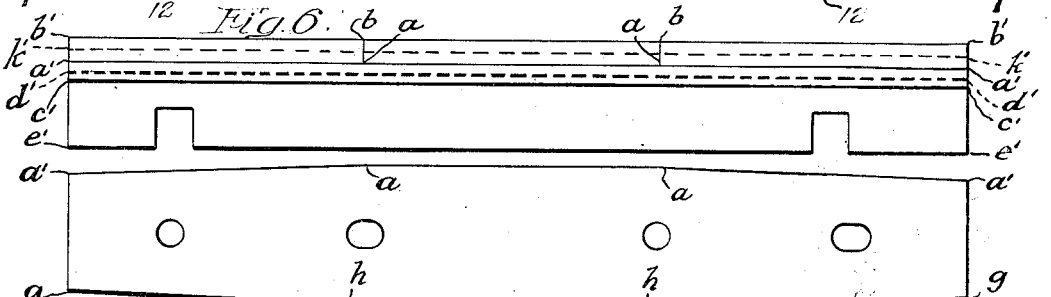
Fig. 6.
Fig. 7.
Inventor
George Langford
By Brown, Jackson, Boettcher & Dienner, Attys.

July 14, 1931.   G. LANGFORD   1,814,835
RAIL JOINT BAR
Filed April 25, 1930    3 Sheets-Sheet 2
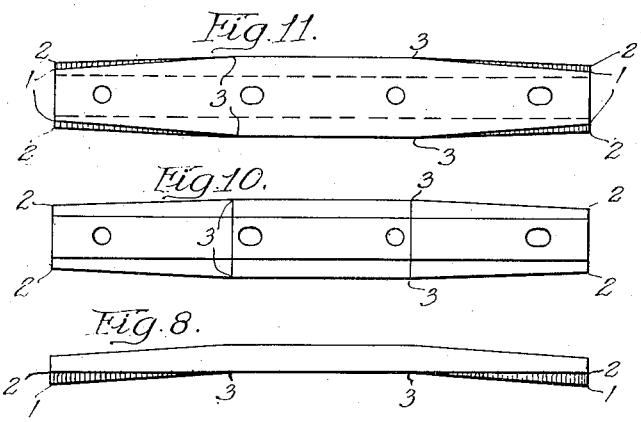
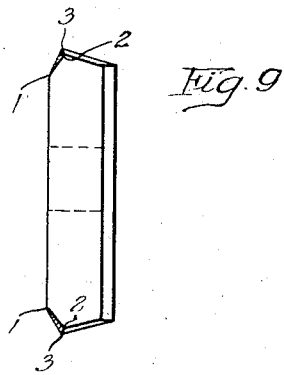
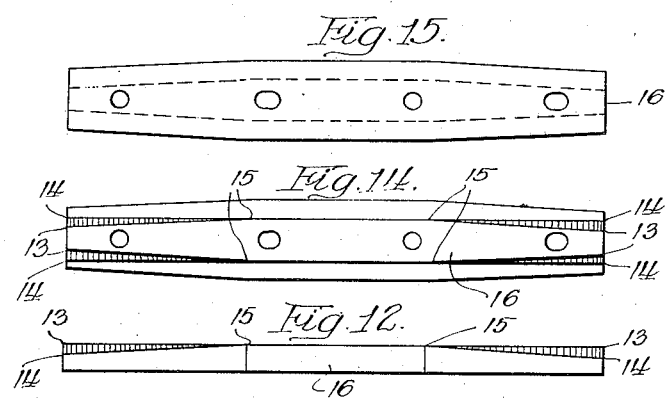
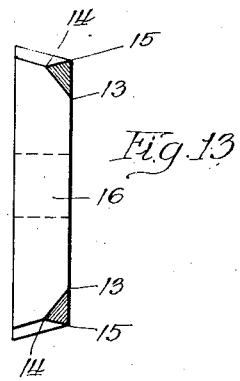
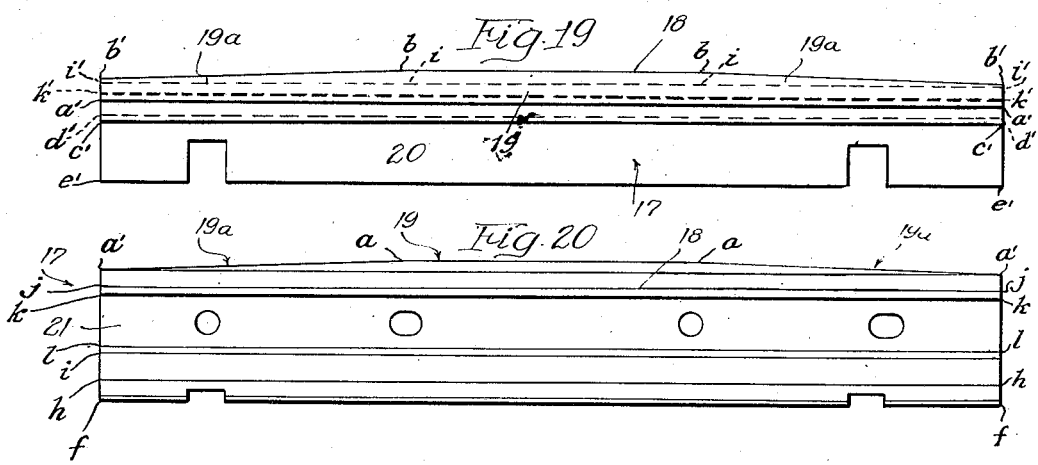
Inventor:
George Langford
By Brown, Jackson, Boettcher & Dienner
Attys.

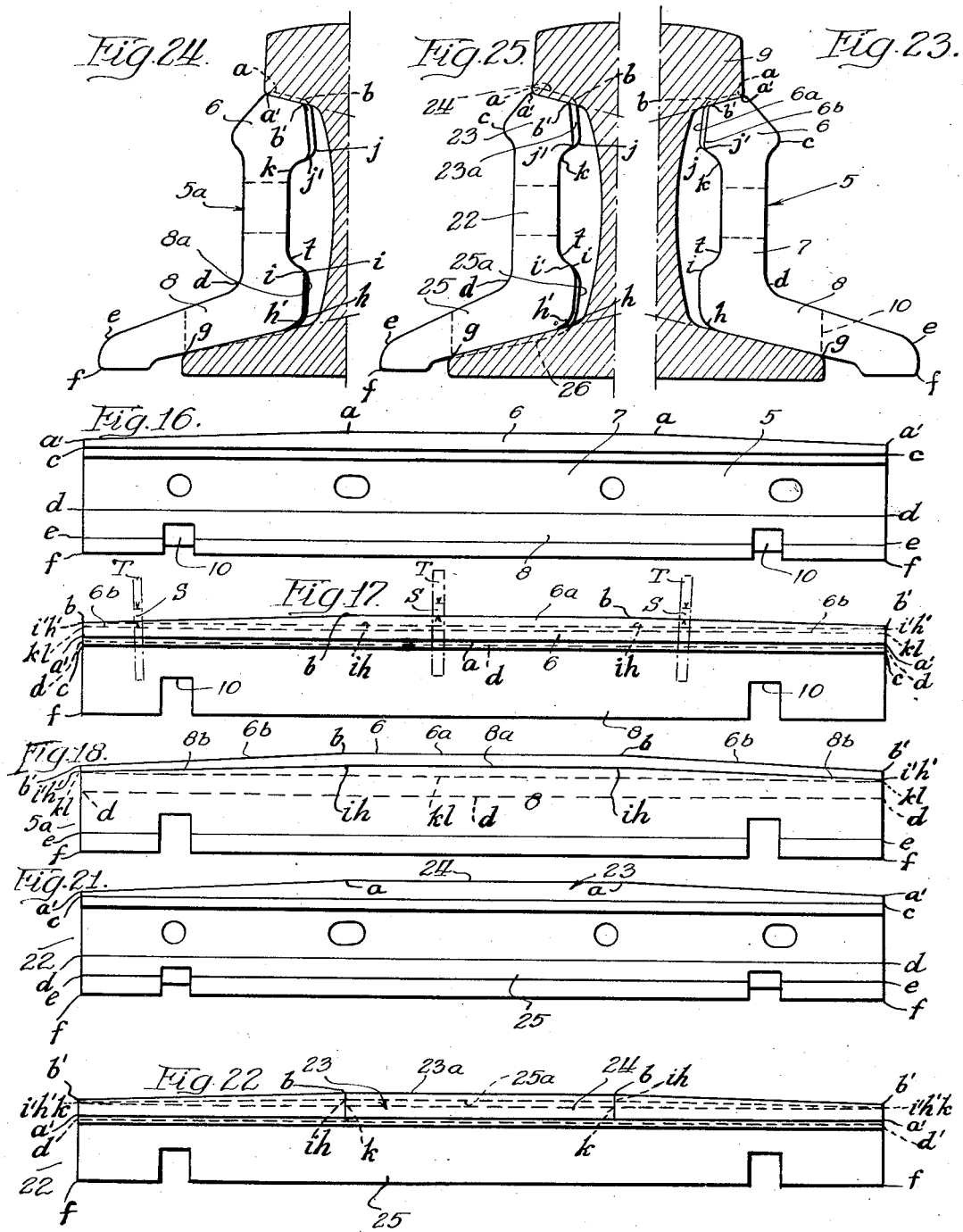

Patented July 14, 1931

1,814,835

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

RAIL JOINT BAR

Application filed April 25, 1930. Serial No. 447,122.

This invention relates to rail joint bars, and more particularly to bars specially adapted for use with worn rail ends.

In considering the bars of my invention, it is necessary to distinguish between the actual height of the bar and the fishing height thereof. The fishing height of a bar is determined by the fishing height of the rail and the draw space. The fishing height of the rail is the vertical distance between the points of intersection of the planes of the rail fishing surfaces with the vertical axis of the rail. The fishing height of the bar is determined by the relation between the fishing height of the rail and the draw space. As a rule, the draw space at the flange or foot portion of the bar is greater than the draw space at the head of the bar and, as the minimum draw space only is considered, the head draw space of the bar and the fishing height of the rail determines the fishing height of the bar.

In former years a draw space of one-eighth of an inch was considered sufficient. If the fishing height of the rail be taken as three and one-quarter inches, the fishing height of the bar would be defined as three and one-quarter inches with one-eighth inch draw space. The tendency, in later years, has been for increased draw space, the present draw space being three-sixteenths of an inch and, in some instances, greater. With this increased draw space the actual height of the bar is increased, but the fishing height of the bar is defined as before, that is, the fishing height of the rail with a draw space of three-sixteenths of an inch. If the fishing height of the rail be taken as three and one-quarter inches, as before, the fishing height of the bar, under present practice, is three and one-quarter inches but with a draw space of three-sixteenths of an inch instead of but one-eighth of an inch, as under the old practice. This is the accepted standard for determining the fishing height of a rail joint bar. In accordance with this standard, if a template of a rail section is applied to a bar at different points spaced apart lengthwise thereof, and the draw space is the same in each instance, such bar is of uniform fishing height.

A rail joint of ordinary construction comprises the rail ends and joint bars secured thereto at opposite sides thereof, by means of bolts passing through the bars and the rail web. These bars are straight laterally and have fishing contact with the head and the flange of the rail ends, the fishing surfaces of the heads and the flanges of the bars being of uniform width. In such a joint wear occurs at the center one-third of the bar, in a short bar, or the center one-fourth of the bar, in a long bar. A short bar is approximately twenty-four inches in length and a long bar may be thirty-six inches or greater in length. This center wear of the joint is characteristic of rail joints of present construction, and the wear at the head of the joint is greater than the wear at the flange or foot of the joint. When the bars are initially applied in the joint, there is draw space between the head and foot of the bar and the web of the rail. As wear progresses, the bars are drawn inwardly to the rails, by bolt tension, to take up wear. Since the wear is at the center of the joint, and little or no wear occurs at the ends of the joint, the end portions of the bar resist inward movement thereof to the rail rendering it difficult, and in some cases impossible, to maintain tight fishing contact at the center of the joint. After the draw space has been used up, or the joint becomes objectionably loose at the center portion thereof, the bars have to be removed and replaced by new or unworn bars. This raises the difficulty of obtaining tight center contact between the bars and the rail ends, due to the wear which has occurred at the head and flange of the rail.

It is known to provide bars having increased fishing height at the center portion thereof, known as crowned bars, for fitting to worn rail ends. These bars have fishing surfaces of uniform width and, when applied in a joint, the crowned central portion of the bar fits into the worn portions of the rail ends. In some instances, the end portions of the bar are flexed inwardly by bolt tension so that the center portion of the bar is held by spring pressure against the rail ends. In such a bar, however, the wear at the center portion is greater than at the end portions, which renders it difficult to maintain the joint tight at the center and necessitates increased crowning of the bars which may be applied to the rails after the crowned bars first applied have worn out.

It is also known to provide bars of abnormal fishing height, such bars being curved inwardly lengthwise thereof and throughout their entire section, the head, the web and the flange of the bar having the same degree of curvature. Such a bar is known as a curved bar. A bar of this type is objectionable in that the head projects outwardly beyond the rail head, at the ends of the bar, and the ends of the bar head are struck by the flanges of the wheel traveling upon the track. A further objection to the incurved bar is that the spike slots are disposed outwardly beyond the rail flange so that the spikes do not contact the rail flange for maintaining the gauge of the track.

An additional objection to the incurved bar is that the head and the flange of the bar have the same degree of inward curvature so that the difference in wear between the head and the flange of the rail is not accommodated.

I have found that the above noted objections to the crowned bar and the incurved bar can be avoided by providing a bar having the outer side of the head and the flange substantially without concave incurvature, and the inner side of the head or the flange curved inwardly to a degree corresponding to the degree of wear of the rail ends to which the bar is to be applied. This bar is subject to certain variations. In one form of my invention both the head and the flange of the bar may be curved inwardly, the outer sides of these elements being without concave incurvature, and the inward curvature thereof being of different degree to compensate for the difference in wear between the head and the flange of the rail. Such a bar is adapted for use with moderately to badly worn rail ends. In another form of my bar, adapted for use with unworn to slightly worn rail ends, the head element only of the bar may be curved inwardly on its inner face, the flange element being uncurved on its inner and outer faces. In cases where the rail ends are extremely worn, both the head and the flange of the bar may be curved inwardly on their inner faces and, in addition to this inward curving, either the head or the flange fishing surface, or both, may be crowned. Further objects and advantages of my invention will appear from the detailed description.

In the drawings:

Figure 1 is a side view of a rail joint of ordinary construction, the bar being shown as a flat strap, illustrating the center wear of the joint;

Figure 2 is an end view of a crowned bar of known type applied to a worn rail end;

Figure 3 is an end view of a curved bar of known type applied to a worn rail end;

Figure 4 is a plan view of the curved bar of Figure 3;

Figure 5 is an outer side view of the curved bar of Figure 3;

Figure 6 is a plan view of the crowned bar of Figure 2;

Figure 7 is an outer side view of the crowned bar of Figure 2, this view being diagrammatic and the bar being shown as a flat strap;

Figure 8 is a plan view of a bar illustrating how the bar of my invention may be produced from a curved bar similar to that of Figure 3, the bar being shown diagrammatically and as a flat strap;

Figure 9 is an end view, on an enlarged scale, of the bar of Figure 8;

Figure 10 is an inner side view of the bar of Figure 8;

Figure 11 is an outer side view of the bar of Figure 8;

Figure 12 is a plan view of a bar, the bar being shown diagrammatically and as a flat strap, illustrating how the bar of my invention may be produced from a bar similar to that of Figure 2;

Figure 13 is an end view of the bar of Figure 12;

Figure 14 is an inner side view of the bar of Figure 12;

Figure 15 is an outer side view of the bar of Figure 12;

Figure 16 is an outer side view of a bar in accordance with the preferred form of my invention;

Figure 17 is a top plan view of the bar of Figure 16;

Figure 18 is an underneath flange view of another form of bar in accordance with my invention;

Figure 19 is a plan view of another form of bar in accordance with my invention;

Figure 20 is an inner side view of the bar of Figure 19;

Figure 21 is an outer side view of still another form of bar in accordance with my invention;

Figure 22 is a plan view of the bar of Figure 21;

Figure 23 is an end view of the bar of Figures 16 and 17 as applied to a rail end;

Figure 24 is an end view of the bar of Figure 18 as applied to a rail end; and

Figure 25 is an end view of the bar of Figures 21 and 22 applied to a rail end.

In the drawings, the lines defining the various elements and the fishing surfaces of the bars are designated by letters, except in such cases where these lines are numbered, the same letters designating corresponding lines and points in the different figures of the drawings, to facilitate an understanding of my invention and its relation to bars of known types. More specifically, in Figures 2 and 3, I have indicated by letters the different points of the elements of the bars, and in the succeeding figures of the drawings these same letters are applied to corresponding points of the bars illustrated, wherever such points occur. The significance of the reference letters will be apparent from the drawings and it is not thought necessary to describe in greater detail the application of such reference letters.

In order to obtain a clear understanding of the construction of the bar of my invention, it is necessary to consider the crowned bar and the incurved bar of the prior art, above referred to. The curved bar of the prior art is shown in Figures 3, 4 and 5. This bar is of uniform fishing height and curved inwardly throughout its entire cross section, both the head and the flange of the bar, as well as the web thereof being thus curved. If this bar be considered as a flat strap, as in Figure 8, the outer face of such a bar can have its concave curvature removed by removing a segment from the outer portion of the bar at each end thereof, as indicated by the shaded segments 1—2—3. The resulting bar would then have its outer concave curvature removed and would retain an inwardly curved inner face. The desired results can be accomplished, however, by removing a segment at each outer corner of the bar instead of removing a segment from each end of the bar and extending the full height thereof, and this I do in the bar of Figure 8. Referring to Figure 9, the fishing surfaces of the bar are inclined oppositely for contact with the fishing surfaces of the rail ends. Due to this inclination of the fishing surfaces, the removal of the segments from the outer fishing corners at the end portions of the bar results in lowering the ends of the outer edge of the upper fishing surface and raising the ends of the outer edge of the lower fishing surface so that this bar, when viewed from the outer side has its outer fishing lines similar to those of a crowned bar, as in Figure 11, and when viewed from the inner side has its inner fishing lines straight or uncrowned as in the ordinary incurved bar. A fishing surface of the resulting bar, therefore, has a crowned outer line without concave incurvature and an uncrowned inner line curved inwardly.

The bar of my invention illustrated in Figures 16, 17 and 23 embodies the broad teaching of Figures 8 to 11 applied to the head of the bar. Bar 5 of Figures 16, 17 and 23 is an angle bar and comprises head 6, web 7 and flange 8. In this bar the outer and the inner sides of the web and the flange are not curved inwardly, the outer side of the head is not curved inwardly and the inner face of the head is curved inwardly.

In such a bar, the width of the head fishing surface decreases from the center portion of the bar to the end thereof. Preferably this decrease in width of the end portions of the head bearing surface is such as to assure more uniform rate of wear of the fishing surface throughout the length of the bar. This is important as it assures that the bar will move inwardly to the rail more uniformly compared with the ends as at the center. This eliminates objectionable center looseness of the joint as compared with the ends, thus prolonging the life of the bar and of the joint as a whole. This incurving of the center portion of the head serves to, in effect, raise the center portion so as to obtain substantially the same results, as to fitting the bar to the rail, as is obtained by using the crowned bar of ordinary type. In addition to this, the reduction in width of the end portions of the head fishing surface results in more uniform rate of wear of the bar, which is not possible with the ordinary crowned bar in which the fishing surface is of uniform width. It is pointed out, however, that the bar of Figures 16, 17 and 23 is not a crowned bar, but is a bar of uniform fishing height. The distinguishing feature of the crowned bar is that it is of greater fishing height at its center portion than at its end portions. Referring to Figure 17, if a template T, corresponding to the section of rail 9, be applied to the bar at the center and the end portions thereof, it will be found that the draw space S is the same in each instance. The bar is, therefore, of uniform fishing height. In this bar the head only is incurved on its inner face, as above noted, such a bar being particularly adapted for use in rail ends which are either unworn or but slightly worn.

Since the outer sides of the head and the flange of the bar 5 are both straight lengthwise of the bar, the ends of the head do not project outwardly beyond the rail head. Furthermore, the spike slots 10 in the flange are so disposed that the spikes will contact the flange of the rail to maintain the gauge of the track. In the curved bar of the prior art, illustrated in Figure 3, the ends of the head at the top project outwardly beyond the head of rail 9 to an objectionable extent, as at 11, and are apt to be struck by the wheel flanges. Furthermore, the spike slots 12 are spaced a considerable distance away from the edge of the flange of the rail. It will thus be seen that, by constructing my bar in the manner illustrated and described, I produce a bar dissimilar to either the ordinary crowned bar or the incurved bar, although my bar will fit accurately into the worn rail ends so as to provide a tight joint, and will provide more uniform fishing wear so as to maintain the joint tight at both center and ends. This I believe to be broadly new.

In Figures 18 and 24 I have illustrated a modified form or bar in which the inner face of flange 8 is curved inwardly. This bar 5ª is adapted for use with moderately to badly worn rails. The head 6 is curved inwardly on its inner face as in bar 5. Referring more particularly to Figure 18, it will be noted that the degree of curvature inwardly of head 6 is greater than the degree of curvature inwardly of the inner side of the flange. This produces, in effect, a different amount of crowning on the head than on the flange, thus compensating for the difference in wear at the head of the rail and at the flange thereof. It is pointed out, however, that this bar is not a crowned bar, but is of uniform fishing height in the same manner as the bar of Figure 17.

While I preferably make the bars of Figures 16 and 18 as new bars, it is possible to produce such bars by reforming from curved bars of ordinary type, as indicated in Figures 8 to 11. It is also possible to produce bars in accordance with my invention from crowned bars of ordinary type. In Figure 12 I have illustrated, in plan view, the crowned bar of Figure 2, this bar being shown as a flat strap. The inner and outer sides of this bar are both straight lengthwise of the bar. If segments 13—14—15 be removed from the inner face of each end portion of bar 16, the inner face of this bar will be curved inwardly and the outer face thereof will be straight lengthwise of the bar. The fishing surfaces of this bar are oppositely inclined, as in Figure 13, and the segments 13—14—15 are of such amount, that the line 14—15 is disposed in the plane of the line defining the inner edge of the central portion of the fishing surface. The line 14—15—15—14 defining the inner edge of each fishing surface of the bar of Figure 14 then become uncrowned and the outer edge of each fishing surface retains its crowned outline though the bar is, in fact, not a crowned bar but a bar of uniform fishing type. A bar thus produced would be incurved at the head and the flange or foot portions on their inner faces, but their outer faces would be straight lengthwise of the bar.

In Figures 19 and 20 I have illustrated a bar 17 which, for purposes of illustration, may be considered as produced from a crowned bar of ordinary type in the manner illustrated in Figures 12 to 15, the changes being made in the head only. Referring to Figure 19, the bar 17 is of angle cross section and the head 18 thereof has its inner face curved inwardly with the end portions 19ª of the head fishing decreasing in width from the center portion 19 of such fishing surface to the ends of the bar. The outer side of the head 18 is straight lengthwise of the bar, as is the outer side of the flange 20 and the outer side of the web element 21. In this bar the inner side of the flange is not incurved, and the same is true of the web.

The bars thus far described are all uncrowned bars and of uniform fishing height. For use with extremely worn rails, I provide a bar similar to that of Figures 18 and 24 but crowned at either the head or the flange, or both. In Figure 25 I have shown such a bar, designated 22, as applied to a badly worn rail end. The head 23 is crowned at its center portion, at 24, the flange 25 being similarly although less crowned at 26. The inner face of the head 23 is curved inwardly, and the inner face of the flange also is curved inwardly, the web having no incurvature. The outer sides of the head, the web and the flange, are not curved inwardly as in the ordinary incurved bar. By thus combining the inward curvature of the inner sides of the head and flange elements, and the crowning of such elements, the bar 22 is well adapted for use with badly worn rails. Referring more particularly to Figure 22, it will be noted that the degree of inward curvature of the inner side of flange 25 is less than the degree of curvature of the inner side of head 23. This difference in curvature of the head and flange compensates for difference in wear of the head and flange of the rail. The bar of Figures 21, 22 and 25 is not of uniform fishing height, due to the crowning or increase in fishing height at the center portion of the bar. This bar, viewed from the inner side, has the inner edges of both its head and its flange fishing surfaces convexed vertically, and the outer edges of such surfaces are also convexed vertically and to a greater extent than the inner edges thereof.

The bar of my invention may be crowned, or it may be of either normal or abnormal fishing height. My invention, however, is mainly directed to a bar of uniform fishing height throughout its length and providing top and bottom fishing contact at the central and the end portions of the bar. In my bar either the head or the foot, or both, have their inner faces incurved and their outer faces without concave incurvature, the web having no curvature on either its inner face or its outer face. The degree of incurvature or convexity of the inner face of the head may differ from that of the flange or foot. The head member or the foot member having an incurved inner face is thicker horizontally at the center thereof than at the ends, and in all cases a member having an incurved inner face has its fishing surface wider at the center and gradually narrowing to less width at the ends. A fishing surface may be narrowed at the ends by incurvature of the inner face of the fishing bearing member, or by beveling off the outer corners, or by both. My invention further provides for the reduction of concave incurvature on the outer face of a fishing bearing member, and a reduction of end fishing width, by removing outer segments from the end portions of an ordinary incurved bar, or by removing inner segments from the end portions of an ordinary uncurved crowned bar, such removal of segments resulting in a narrowing of one or both fishing surfaces at the end portions of the bar.

What I claim is:

1. A rail joint bar having a head element and a foot element provided with fishing surfaces adapted for both center and end fishing contact with the rail ends when the bar is applied in a joint, the outer side of the bar being substantially straight laterally and the inner side of the respective elements being curved inwardly and lengthwise of the bar when the bar is out of a joint and free from lateral tension, said elements having different degrees of inward curvature.

2. A rail joint bar comprising a head element, a flange element and a connecting web, said bar being adapted for both center and end fishing contact with the rail ends when applied in a joint, the outer faces of the web and said elements being without incurvature and the inner sides of both of said elements being curved inwardly lengthwise of the bar and having different degrees of curvature when the bar is out of a joint and free from lateral tension, said elements and their fishing surfaces being of less width at the end portions than at the center portions thereof.

3. A rail joint bar comprising a head element, a flange element and a connecting web, said bar being of uniform and abnormal fishing height and adapted for both center and end fishing contact with worn rail ends when applied in a joint, one only of said elements being curved inwardly, said element and the fishing surface thereof decreasing in width from the center portion of the bar toward the ends thereof.

4. A rail joint bar having a head element and a foot element and a connecting web, said elements being provided with fishing surfaces adapted for both center and end fishing contact with the rail ends when the bar is applied in a joint, the outer faces of the bar, including the web, being substantially without incurvature and the inner side of the head and the foot element being curved inwardly, said elements having different degrees of inward curvature and the central portions of the fishing surfaces of said elements being of greater width than the end portions thereof.

5. A rail joint bar having a head element and a foot element adapted for both center and end fishing contact with the rail ends when the bar is applied in a joint, said bar having the outer side of one of said elements without incurvature and the inner side of said element curved inwardly thereby reducing the thickness and width of the fishing surfaces of such element at its end portions relative to its central portion, the other one of said elements being without incurvature and being of uniform thickness and width of fishing surface.

6. A rail joint bar having a head element and a foot element and a connecting web, said elements being provided with fishing surfaces for both center and end fishing contact with the rail ends when the bar is applied in a joint, the outer faces of the bar, including the web, being substantially without incurvature, and the inner side of the head and the foot element being curved inwardly, the inner side of the web being substantially without incurvature and the central portions of the fishing surfaces of said elements being of greater width than the end portions thereof.

7. A rail joint bar having a head element and a foot element and a connecting web, said elements being provided with fishing surfaces for both center and end fishing contact with the rail ends when the bar is applied in a joint, the outer faces of the bar, including the web being substantially without incurvature, and one at least of said elements having its inner side curved inwardly, the inner side of the web being substantially without incurvature, and the central portion of the fishing surface of said element with its inner side curved inwardly being of greater width than the end portion.

In witness whereof, I hereunto subscribe my name this 22nd day of April, 1930.

GEORGE LANGFORD.